(12) United States Patent
Lee

(10) Patent No.: US 6,960,015 B2
(45) Date of Patent: Nov. 1, 2005

(54) CUTTER STAND OF A MIXER

(76) Inventor: Ming-Tsung Lee, P.O. Box 90, Tainan City (TW)

( * ) Notice: Subject to any disclaimer, the term of this patent is extended or adjusted under 35 U.S.C. 154(b) by 149 days.

(21) Appl. No.: 10/702,460

(22) Filed: Nov. 7, 2003

(65) Prior Publication Data

US 2005/0099884 A1 May 12, 2005

(51) Int. Cl.$^7$ ............................ A47J 43/046; A47J 43/07
(52) U.S. Cl. ............................................. 366/205
(58) Field of Search ................. 366/205, 314, 366/331; 99/348; 241/282.1, 282.2

(56) References Cited

U.S. PATENT DOCUMENTS

| | | | | |
|---|---|---|---|---|
| 2,992,715 A | * | 7/1961 | Blachly ........................ | 366/205 |
| 3,540,234 A | * | 11/1970 | Gordon ........................ | 366/205 |
| 3,603,364 A | * | 9/1971 | Samuelian et al. .......... | 366/205 |
| 3,612,126 A | * | 10/1971 | Emmons et al. ............. | 366/205 |
| 3,738,583 A | * | 6/1973 | Berland et al. .............. | 366/205 |
| 3,784,118 A | * | 1/1974 | Hurwitz ..................... | 241/282.1 |
| 3,785,579 A | * | 1/1974 | Voglesonger ............... | 241/282.1 |
| 4,149,271 A | * | 4/1979 | Uibel et al. ................. | 366/314 |
| 4,462,694 A | * | 7/1984 | Ernster et al. .............. | 366/205 |
| 5,584,577 A | * | 12/1996 | Thies ........................ | 366/205 |
| 6,523,993 B2 | * | 2/2003 | Williams et al. ............ | 366/205 |
| 6,532,863 B1 | * | 3/2003 | Lee .............................. | 99/348 |
| 6,709,150 B2 | * | 3/2004 | Lin .............................. | 366/314 |

FOREIGN PATENT DOCUMENTS

| | | | |
|---|---|---|---|
| DE | 19907052 A1 | * | 8/2000 |
| EP | 0317095 A1 | * | 5/1989 |
| EP | 1435214 A2 | * | 7/2004 |
| JP | 1-221122 | * | 9/1989 |

* cited by examiner

*Primary Examiner*—Charles E. Cooley

(57) ABSTRACT

The cutter stand of a mixer includes a set of blades and a blade holder installed at the bottom of the bowl of a mixer. The set of blades has a vertical shaft extending downward and the blade holder is fitted on the shaft, with a clutch installed under the blade base and threadably assembled with the shaft. The blade holder is composed of a bearing base, a copper alloy bush, a bearing sleeve, two heat-insulating and waterproof washers and a waterproof gasket. The shaft is inserted through the bearing sleeve, the copper alloy bush and the bearing base and then threadably assembled with the clutch connected with a motor which will drive the shaft to rotate and actuate the set of blades to rotate and beat fruit into juice. Thus the cutter stand of a mixer is assembled quickly, having effects of heat insulation, shock absorption and noise abatement.

3 Claims, 2 Drawing Sheets

CUTTER STAND OF A MIXER

BACKGROUND OF THE INVENTION

1. Field of the Invention

This invention relates to the cutter stand of a mixer, particularly to one having a set of blades and a blade holder assembled at the bottom of the bowl of a mixer. The blade holder is composed of a bearing base, a copper alloy bush, a bearing sleeve, two waterproof washers and a gasket. The set of blades is secured to a vertical shaft passing through the blade holder and screwed with a clutch connected with a motor which will drive the shaft to rotate and actuate the blades rotate to beat fruit into juice, able to be assembled quickly and having excellent effect of heat insulation. In addition, the blade holder has two waterproof washers respectively provided at the upper and the lower end of a copper alloy bush to prevent oil splashing.

2. Description of the Prior Art

The cutter stand of a conventional mixer is provided with a vertical shaft under a set of blades. The shaft of the cutter stand is connected with the rotating shaft of a motor by a connecting member so as to let the motor drive the set of blades to rotate rapidly to beat fruit into juice. However, the conventional cutter stand driven to rotate at high speeds will produce a high temperature, and the metallic shaft and its shaft cover can hardly disperse heat, and it is likely to cause oil splashing due to a centrifugal force produced by rotating at high speeds.

SUMMARY OF THE INVENTION

The objective of the invention is to offer a cutter stand of a mixer, able to be assembled quickly, having excellent effect of heat insulation and also of preventing oil splashing.

The cutter stand of the invention is composed of a bearing base, a copper-alloy bush, two waterproof washers, a bearing sleeve and a waterproof gasket. The bearing base is threadably assembled with the support base of the bowl of the cutter stand and formed with a chamber having a through hole bored at the bottom. The copper alloy bush is received in the chamber of the bearing base, having an axial passage inside. The two waterproof washers are respectively positioned on the upper and the lower end of the copper alloy bush. The bearing sleeve is assembled on the bearing base, having its upper end inserted through the insert hole of the bowl and an axial through hole aligned to both the passageway of the copper alloy bush and the through hole of the bearing sleeve, with a waterproof gasket fitted around the bearing sleeve.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
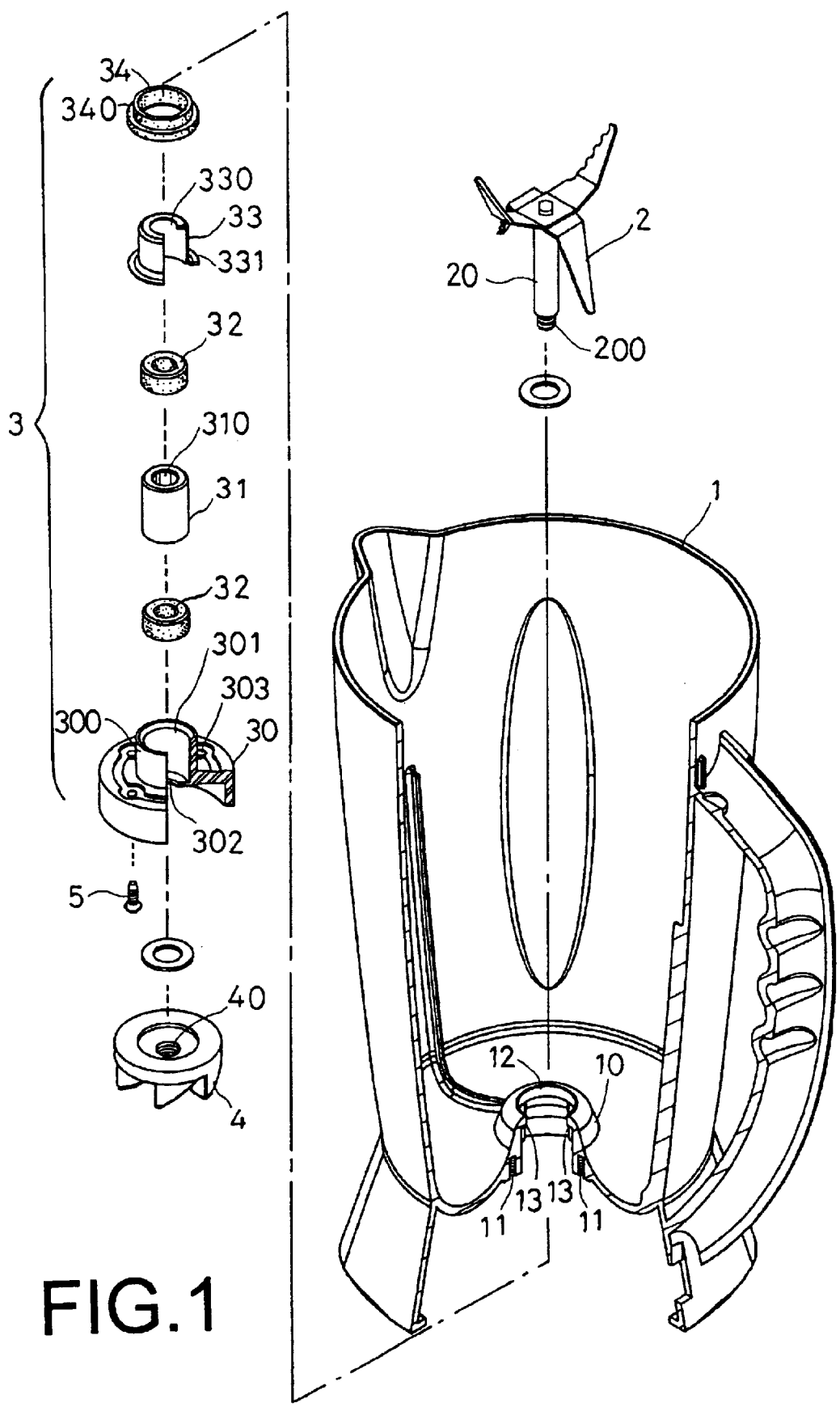
FIG. 1 is an exploded perspective view of the cutter stand of a mixer in the present invention; and, FIG. 2 is a cross-sectional view of the cutter stand of a mixer in the present invention.
Figure 2:
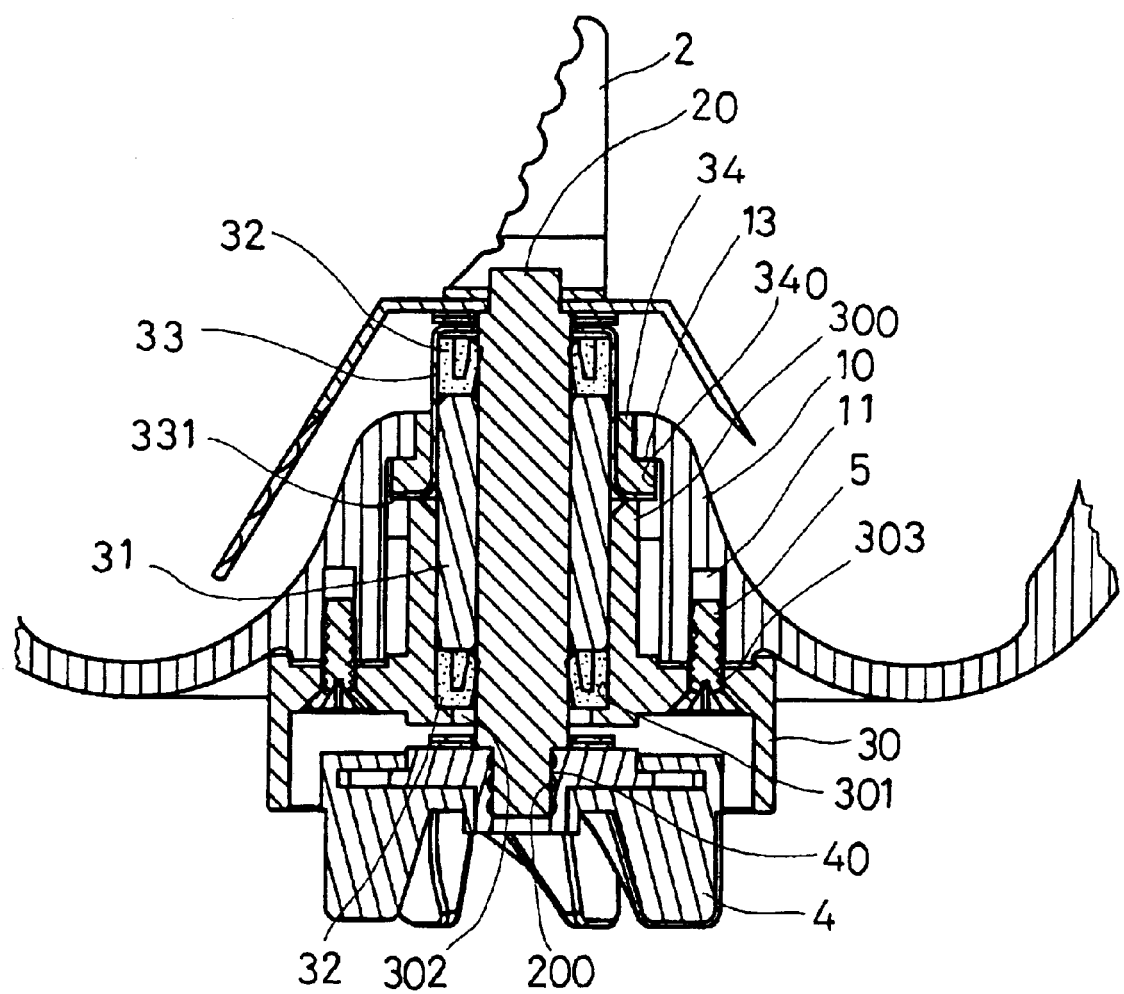

A preferred embodiment of the cutter stand of a mixer in the present invention, as shown in FIGS. 1 and 2, includes a bowl 1, a set of blades 2, a blade holder 3 and a clutch 4 as main components combined together.

The bowl 1 has its lower side formed with a support base 10 having plural threaded holes 11 at the bottom and has an insert hole 12 bored in the center at the its bottom and having an annular stop edge 13 formed at the lower side.

The set of blades 2 assembled on the bottom of the bowl 1 is secured to a vertical shaft 20 extending downward and inserted through the insert hole 12 at the bottom of the bowl 1, with the lower end of the shaft 20 formed with a threaded portion 200.

The blade holder 3 positioned under the set of the blades 2 consists of a bearing base 30, a copper alloy bush 31, two waterproof washers 32, a bearing sleeve 33 and a waterproof gasket 34. The bearing base 30 to be threadably assembled the support base 10 of the bowl 1 is provided in the center with an extending-up neck 300 having its interior formed with a chamber 301 having a through hole 302 at the lower side. The bearing base 30 is further bored with plural threaded holes 303 matching with the threaded holes 11 of the bowl 1, with bolts 5 respectively screwed in the threaded holes 11 and 303 to fix the bearing base 30 on the support base 10 of the bowl 1. The copper alloy bush 31 is received in the chamber 301 of the bearing base 30, having an axial passageway 310 inside. The two waterproof washers 32 made of a waterproof and heat-insulating material are respectively assembled on the upper and the lower end of the copper alloy bush 31. The bearing sleeve 33 to be assembled on the bearing base 30 has its upper end inserted upward through the insert hole 12 of the bowl 1 and is bored in the center with a lengthwise through hole 330 aligned to both the passageway 310 of the copper alloy bush 31 and the through hole 302 of the bearing base 30, having its lower side formed with a flange 331. The waterproof gasket 34 made of a waterproof and heat-insulating material is fitted around the bearing sleeve 33 and rests on the flange 331, having its outer side formed with a projecting edge 340 to push against the stop edge 13 at the bottom of the support base 10 of the bowl 1. The clutch 4 to be assembled under the bearing base 30 is formed with a combining portion 40 in the center to be screwed with the threaded portion 200 of the shaft 20. In addition, the clutch 4 is connected with a motor, which will drive the shaft 20 to rotate and actuate the set of blades 2 to rotate and beat fruit into juice.

In assembling, as shown in FIGS. 1 and 2, firstly, one of the two waterproof washers 32 is deposited at the bottom of the chamber 301 of the bearing base 30, and the copper alloy bush 31 is received in the chamber 301 and positioned on the waterproof washer 32. Next, the other waterproof washer 32 is placed in the bearing sleeve 33 and the waterproof gasket 34 is fitted around the bearing sleeve 33 and then the bearing sleeve 33 is assembled on the copper alloy bush 31, letting the copper alloy bush 31 push against the waterproof washer 32, and the upper edge of the bearing base push against the bottom side of the peripheral rim 331 of the bearing sleeve 33. Subsequently, the assembled blade holder 3 is assembled under the bowl 1, letting the bearing sleeve 33 inserted out of the insert hole 12 of the bowl 1 and the flange 340 of the waterproof gasket 34 push against the stop edge 13 of the support base 10 at the bottom of the bowl 1. Then, the bearing base 30 is fixedly assembled under the bowl 1 by bolts 5 inserted in the threaded holes 303 of the bearing base 30 and the threaded holes 11 of the bowl 1. Lastly, the set of blades 2 has its shaft 20 inserted downward through the through hole 330 of the bearing sleeve 33, the passageway 310 of the copper alloy bush 31 and the through hole 302 of the bearing base 30, and then the threaded portion 200 of the shaft 20 is screwed with the combining portion 40 of the clutch 4 to finish assembly of the cutter stand of the mixer.

As can be understood from the above description, this invention has the following advantages.

1. It can be assembled quickly and stably.
2. The bearing base enables the components of the blade holder to be positioned easily and the whole components have an excellent effect of heat insulation.
3. The waterproof gasket made of a waterproof and heat-insulating material is fitted around the bearing sleeve, not only having a waterproof function but also having effects of shock absorption and noise abatement when the components rotate at high speeds.
4. The two waterproof washers respectively assembled on the upper and the lower end of the copper alloy bush are able to avoid oil splashing when the components rotate at high speeds.

While the preferred embodiment of the invention has been described above, it will be recognized and understood that various modifications may be made therein and the appended claims are intended to cover all such modifications that may fall within the spirit and scope of the invention.

What is claimed is:

1. The cutter stand of a mixer comprising:
   a bowl formed with a support base at the bottom, said support base bored with plural threaded holes at the lower side, said bowl having its lower side bored with an insert hole in the center at the bottom, said insert hole provided under with an annular stop edge;
   a set of blades installed at the lower portion of said bowl, said set of blades secured on a vertical shaft extending downward, said shaft inserted through said insert hole of said bowl, said shaft having its lower end formed with a threaded portion;
   a blade holder assembled under said set of blades;
   a clutch assembled under said blade holder, said clutch threadably assembled with said set of blades; and,
   characterized by said blade holder composed of a bearing base, a copper alloy bush, two waterproof washers, a bearing sleeve and a waterproof gasket, said bearing base threadably assembled with said support base of said bowl, said bearing base formed with a chamber inside, said chamber bored with a through hole at the bottom, said copper alloy bush received in said chamber of said bearing base, said copper alloy bush formed with an axial passageway in the interior, said two waterproof washers respectively assembled on the upper and the lower end of said copper alloy bush, said bearing sleeve assembled on said bearing base, said bearing sleeve having its upper end inserted upward through said insert hole of said bowl, said bearing sleeve bored in the center with an axial through hole aligned to both said passageway of said copper alloy bush and said through hole of said bearing base, said waterproof gasket fitted around said bearing sleeve;
   said bearing base enabling the components of said blade holder to be positioned easily, said cutter stand able to be assembled quickly and having excellent effect of heat insulation, said waterproof gasket and said two waterproof washers also having effects of shock absorption and noise abatement and of preventing oil splashing.

2. The cutter stand of a mixer as claimed in claim 1, wherein said bearing base of said blade holder is provided with an extending-up neck on the central portion and bored with plural threaded holes to match with said threaded holes of said bowl, with bolts inserted upward in said threaded holes to fix said bearing base under said support base of said bowl, said bearing sleeve having its lower side formed with a flange for said waterproof gasket to rest thereon, said waterproof gasket provided with a flange around its lower outer side, said flange pushing against said stop edge of said support base of said bowl.

3. The cutter stand of a mixer as claimed in claim 1, wherein said waterproof gasket and said waterproof washers of said blade holder are made of a waterproof and heat-insulating material.

* * * * *